United States Patent
Knode et al.

(10) Patent No.: US 9,595,880 B2
(45) Date of Patent: Mar. 14, 2017

(54) AUTOMATIC CONFIGURATION OF A LOAD CONTROL SYSTEM

(71) Applicant: Lutron Electronics Co., Inc., Coopersburg, PA (US)

(72) Inventors: Galen Edgar Knode, Macungie, PA (US); Steven J. Kober, Center Valley, PA (US); Daniel Curtis Raneri, Orefield, PA (US); Richard M. Walsh, III, Bethlehem, PA (US)

(73) Assignee: LUTRON ELECTRONIC CO., INC., Coopersburg, PA (US)

( * ) Notice: Subject to any disclaimer, the term of this patent is extended or adjusted under 35 U.S.C. 154(b) by 0 days.

(21) Appl. No.: 14/808,909

(22) Filed: Jul. 24, 2015

(65) Prior Publication Data
US 2016/0028320 A1 Jan. 28, 2016

Related U.S. Application Data

(60) Provisional application No. 62/029,177, filed on Jul. 25, 2014.

(51) Int. Cl.
*H05B 37/02* (2006.01)
*H02M 5/04* (2006.01)

(52) U.S. Cl.
CPC .............. *H02M 5/04* (2013.01); *H05B 37/02* (2013.01); *H05B 37/0245* (2013.01)

(58) Field of Classification Search
CPC ............ H05B 33/0815; H05B 33/0818; H05B 37/029; H05B 37/0245; H05B 37/0254;
(Continued)

(56) References Cited

U.S. PATENT DOCUMENTS 4,333,310 A * 6/1982 Uram .................... F01K 23/105
60/39.182
5,357,170 A 10/1994 Luchaco et al.
(Continued)

OTHER PUBLICATIONS

Lutron Electronics Co., Inc., *EcoSystem technical guide*, P/N 267-1028, Mar. 2006, 32 pages.
(Continued)

*Primary Examiner* — Douglas W Owens
*Assistant Examiner* — Syed M Kaiser
(74) *Attorney, Agent, or Firm* — Condo Roccia Koptiw LLP

(57) ABSTRACT

A control module is able to be installed with electrical devices, such as, for example electrical loads (e.g., lighting loads) and/or load regulation devices. The control module may determine whether the electrical loads (e.g., drivers for lighting loads) are responsive to one or more of a plurality of control techniques. The control module may be able to automatically determine an appropriate control technique to use to control the connected driver and/or lighting load. The control module may sequentially attempt to control the connected driver and/or lighting load using each of the plurality of control techniques and determine if the driver and/or lighting load is responsive to the present control technique. The plurality of control techniques may include one or more analog control techniques and one or more digital control techniques.

29 Claims, 4 Drawing Sheets

(58) Field of Classification Search
CPC .............. H05B 41/3925; H05B 41/391; H05B 41/2828; H05B 33/0803
USPC .......................... 315/291, 224, 200 R, 307
See application file for complete search history.

(56) References Cited

U.S. PATENT DOCUMENTS

| | | | |
|---|---|---|---|
| 6,037,721 A | 3/2000 | Lansing et al. | |
| 6,188,181 B1 | 2/2001 | Sinha et al. | |
| 6,225,760 B1 | 5/2001 | Moan | |
| 6,310,440 B1 | 10/2001 | Lansing et al. | |
| 6,528,957 B1 | 3/2003 | Luchaco | |
| 6,667,578 B2 | 12/2003 | Lansing et al. | |
| 6,794,830 B2 | 9/2004 | Lansing et al. | |
| 6,813,720 B2 | 11/2004 | Leblanc | |
| 7,369,060 B2 | 5/2008 | Veskovic et al. | |
| 7,619,539 B2 | 11/2009 | Veskovic et al. | |
| 8,212,485 B2 * | 7/2012 | Elek .................. | H05B 37/0272 315/130 |
| 8,319,452 B1 | 11/2012 | Hamel et al. | |
| 8,508,149 B2 | 8/2013 | Mohan et al. | |
| 2009/0079357 A1 * | 3/2009 | Shteynberg ........ | H05B 33/0818 315/291 |
| 2009/0079358 A1 * | 3/2009 | Shteynberg ........ | H05B 33/0818 315/291 |
| 2009/0295352 A1 * | 12/2009 | Hamaya .................. | G03G 15/80 323/283 |
| 2010/0280677 A1 | 11/2010 | Budike, Jr. | |
| 2010/0289430 A1 | 11/2010 | Stelzer et al. | |
| 2011/0204803 A1 * | 8/2011 | Grotkowski ....... | H05B 33/0815 315/194 |
| 2012/0032599 A1 | 2/2012 | Mohan et al. | |
| 2012/0130544 A1 | 5/2012 | Mohan et al. | |
| 2012/0299485 A1 | 11/2012 | Mohan et al. | |
| 2013/0181630 A1 | 7/2013 | Taipale et al. | |
| 2013/0320859 A1 | 12/2013 | Mohan et al. | |
| 2014/0001959 A1 | 1/2014 | Motley et al. | |
| 2014/0001962 A1 | 1/2014 | Harris | |
| 2014/0001963 A1 | 1/2014 | Chobot et al. | |
| 2014/0001972 A1 | 1/2014 | Harris et al. | |
| 2014/0167620 A1 | 6/2014 | Chobot | |
| 2014/0167622 A1 | 6/2014 | Chobot et al. | |
| 2014/0167623 A1 | 6/2014 | Chobot et al. | |
| 2014/0167642 A1 | 6/2014 | Chobot | |
| 2014/0239842 A1 | 8/2014 | Salvestrini | |
| 2014/0265880 A1 | 9/2014 | Taipale et al. | |
| 2014/0265935 A1 * | 9/2014 | Sadwick ............ | H05B 33/0815 315/307 |
| 2014/0266118 A1 * | 9/2014 | Chern ................... | H02M 3/156 323/283 |
| 2015/0048762 A1 * | 2/2015 | Yang ...................... | H05B 37/02 315/307 |
| 2015/0280823 A1 * | 10/2015 | Breuer ............... | H04B 10/1149 398/25 |
| 2015/0282270 A1 * | 10/2015 | Loveridge .......... | H05B 33/0845 315/224 |
| 2015/0282282 A1 * | 10/2015 | Breuer ............... | H05B 37/0272 315/152 |

OTHER PUBLICATIONS

Lutron Electronics Co., Inc, EcoSystem, C5-BMF-2A, EcoSystem Module, Feb. 19, 2008, 6 pages.

Lutron Electronics Co., Inc, EcoSystem Ballast Module Fixture Mount (BMF) Install Guide, P/N 032-160 Rev. A, Jan. 24, 2006, 2 pages.

* cited by examiner

AUTOMATIC CONFIGURATION OF A LOAD CONTROL SYSTEM

CROSS-REFERENCE TO RELATED APPLICATIONS

This application claims the benefit of U.S. Provisional Application No. 62/029,177, filed Jul. 25, 2014, which is incorporated by reference herein as if fully set forth.

BACKGROUND

A user environment, such as a residence or an office building for example, may be configured using various types of load control systems. A lighting control system may be used to control the lighting loads in the user environment. A motorized window treatment control system may be used to control the natural light provided to the user environment. An HVAC system may be used to control the temperature in the user environment. Each load control system may include various control devices, including control-source devices and control-target devices. The control-target devices may receive digital messages, which may include load control instructions, for controlling an electrical load from one or more of the control-source devices. The control-target devices may be capable of directly controlling an electrical load. The control-source devices may be capable of indirectly controlling the electrical load via the control-target device. Examples of control-target devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of control-source devices may include remote control devices, occupancy sensors, daylight sensors, temperature sensors, and/or the like.

A load regulation device (e.g., such as a driver or ballast) and/or an electrical load (e.g., such as an incandescent light source, an LED light source, gas-discharge lamp, etc.) may be configured to respond to one of a variety of control techniques. The control technique may be an analog control technique or a digital control technique. The analog control technique may include a 0-10V control technique, a 10-0V control technique, an analog pulse-width modulated (PWM) control technique, and/or the like. The digital control technique may include a digital PWM control technique, a digital messaging control technique (e.g., such as the digital addressable lighting interface (DALI) protocol, an ECOSYSTEM protocol, etc.), and/or the like. However, a control module may not be aware of the particular control technique used by a load regulation device and/or electrical load to which it is connected. If the control module is configured to control the load regulation devices and/or electrical load with the incorrect control technique, the load regulation devices and/or electrical load may not respond (e.g., may not respond properly). As such, there exists a need for a control module that is configured to determine (e.g., automatically determine) to which of a plurality of control techniques a load regulation device and/or electrical load is responsive.

SUMMARY

The present application relates to a load control system and/or a control module for controlling the amount of power delivered to one or more electrical loads, and more particularly, to a load control system (e.g., a wireless load control system) and/or control module able to be automatically configured to one of a plurality of control techniques based on the connected electrical load (e.g., driver and/or lighting load).

A control module may comprise a processor, a memory, a control circuit, an output power connection, a control connection, and/or a power measurement circuit. The control module may be configured to control an electrical load. The electrical load may comprise a driver for controlling a light load (e.g., a light emitting diode (LED) driver for controlling an LED light source). The output power connection may be adapted to be coupled to the electrical load for providing power to the electrical load. For example, the electrical load may receive power from a power source, for example, via the control module. The power measurement circuit may be coupled to the output power connection for measuring the amount of power being delivered to the driver.

The control connection may be adapted to provide a control signal to the electrical load in accordance with a plurality of control techniques. The plurality of control techniques may comprise one or more analog control techniques and/or one or more digital control techniques. The one or more analog control techniques may comprise a 0-10V control technique, a 10-0V control technique, an analog PWM control technique, a switching-only control technique, a phase-control control technique, and/or the like. The one or more digital control techniques may comprise a digital PWM control technique, a digital messaging control technique (e.g., such as the digital addressable lighting interface (DALI) protocol, an ECOSYSTEM protocol, etc.), and/or the like.

The control circuit may be configured to sequentially generate the control signal at the control connection according to each of the plurality of control techniques, for example, in any order or combination. The control circuit may be configured to determine if the electrical load is responsive to at least one of the plurality of control techniques, for example, by monitoring a parameter of the electrical load (e.g., the driver and/or the lighting load). For example, the control circuit may be configured to attempt to adjust an intensity of the lighting load to a predetermined intensity using one of the control techniques, and measure the power being consumed by the driver and/or the lighting load at the predetermined intensity to determine if the driver is responsive to the control technique. If the control circuit determines that the driver is not responsive to the control technique, the control circuit may attempt to adjust the intensity of the lighting load to the predetermined intensity using another one of the control techniques, and determine if the driver is responsive. The predetermined intensity may be a high-end intensity and/or a low-end intensity. For example, the control circuit may be configured to attempt to adjust the intensity of the lighting load to the high-end intensity and/or to the low-end intensity using one of the control techniques, and to measure the power being consumed by the driver and/or the lighting load at the high-end intensity and/or at the low-end intensity to determine if the driver is responsive to the selected control technique.

The control circuit may be configured to transmit a digital message, in accordance with a digital control technique, to the driver via the control connection. The control circuit may be configured to determine if the driver transmits a response to the digital message to determine if the driver is responsive to the control technique. The control circuit may be configured to receive a digital message according to a digital control technique, the digital message indicating a measured intensity of the lighting load, and to determine if the driver is responsive to the control technique based on the measured intensity.

If the control circuit determines that the electrical load is responsive to a specific control technique, the control circuit may be configured to control the electrical load using the specific control technique during normal operation. If the control circuit determines that the electrical load is not responsive to the control techniques other than a switching-only control technique, the control circuit may be configured to control the electrical load using the switching-only control technique during normal operation.

DETAILED DESCRIPTION

Figure 1:
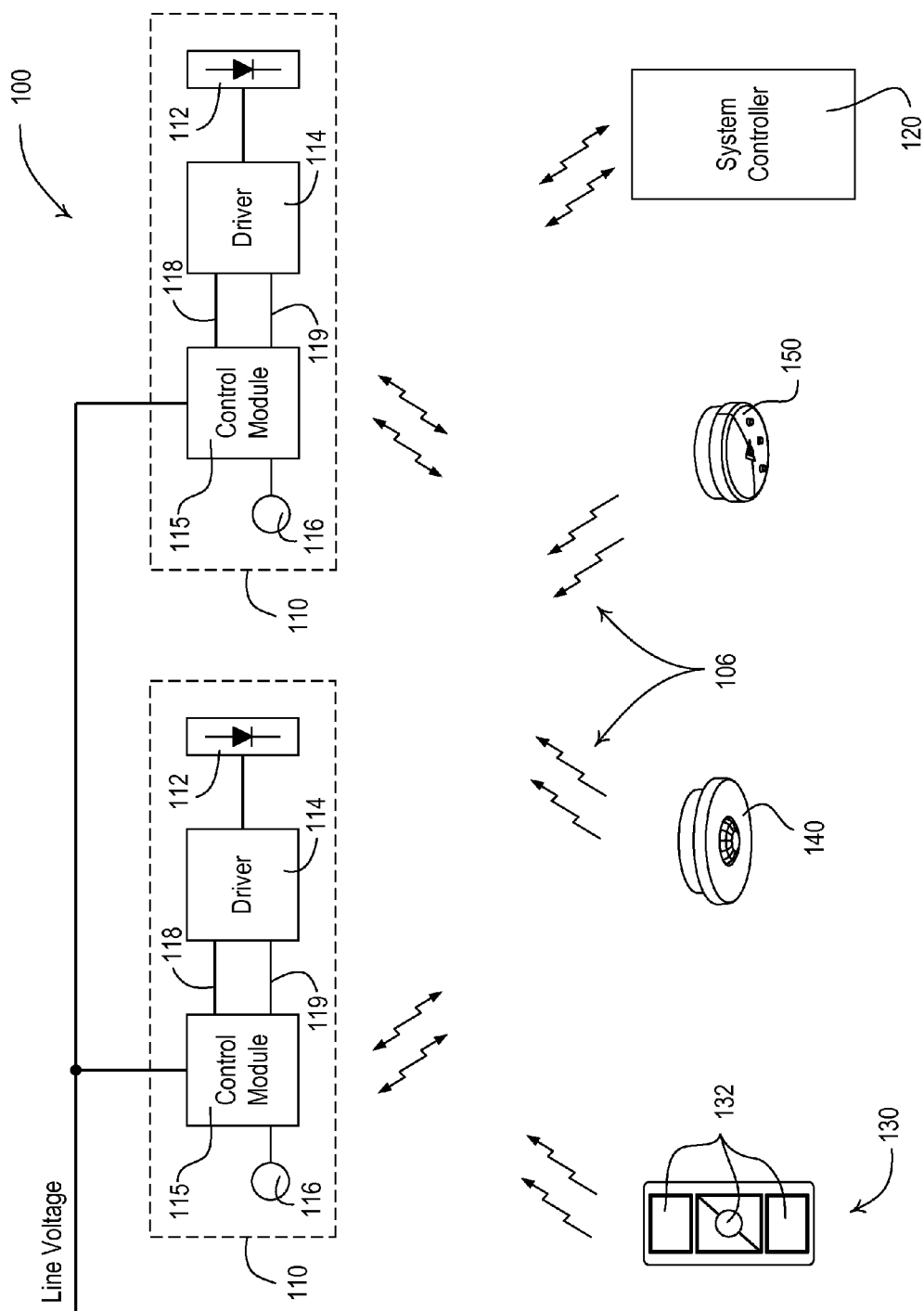
FIG. 1 is a simple wiring diagram of a load control system having a plurality of controllable lighting fixtures, each with a control module, a load regulation device (e.g., a driver), and a lighting source, for illuminating a space.

FIG. 1 is a simple wiring diagram of a load control system 100 comprising a plurality of controllable lighting fixtures 110 for illuminating a space. Each lighting fixture 110 may comprise a lighting load, e.g., a light-emitting diode (LED) light source 112, and/or a respective load regulation device, e.g., an LED driver 114, for controlling the lighting load. Each light fixture 110 may comprise a respective control module 115 that is adapted to be coupled to a power source, e.g., an alternating-current (AC) power source providing a line voltage. The control module 115 may be configured to provide power to the driver 114 via power wiring 118. The control module 115 may be configured to generate one or more control signals, which may be provided to the driver 114 via control wiring 119 for controlling the LED light source 112. The control module 115 may be mounted to an internal or external surface of the respective fixture 110 or to a junction box located adjacent to the fixture. An example of an assembly of a control module is described in greater detail in commonly-assigned U.S. Patent Application Publication No. 2012/0313456, published Dec. 13, 2012, entitled LOAD CONTROL DEVICE HAVING AN ELECTRICALLY ISOLATED ANTENNA, the entire disclosure of which is hereby incorporated by reference.

The driver 114 may be configured to control the power delivered to the light source 112, and thus the intensity of the light source 112 in response to the control signals received via the control wiring 119. The driver 114 may be configured to turn the light source 112 on and off and to adjust the intensity of the light source 112 between a low-end (minimum) intensity $L_{LE}$ and a high-end (maximum) intensity $L_{HE}$. The driver 114 may be configured to control the power delivered to the light source 112, for example, by regulating the voltage generated across the light source and/or regulating the current conducted through the light source. Examples of LED drivers are described in greater detail in commonly-assigned U.S. Pat. No. 8,492,987, issued Jul. 23, 2013, entitled LOAD CONTROL DEVICE FOR A LIGHT-EMITTING DIODE LIGHT SOURCE, and U.S. Patent Application Publication No. 2014/0009084, published Jan. 9, 2014, entitled FORWARD CONVERTER HAVING A PRIMARY-SIDE CURRENT SENSE CIRCUIT, the entire disclosures of which are hereby incorporated by reference.

The control module 115 may be configured to control a plurality of different types of drivers 114. The control module 115 may be configured to generate appropriate control signals for controlling drivers 114 having different types of control inputs (e.g., control techniques). The driver 114 that is coupled to the control module 115 in each lighting fixture 110 may be responsive to a subset of control signals (e.g., a single type, or more than one control signal) received via the control wiring 119.

The driver 114 may be responsive to an analog control signal, such as a 0-10V control signal, a 10-0V control signal, an analog PWM control signal, and/or other types of analog control signal, received via the control wiring 119. An analog PWM control signal may have, for example, a duty cycle that indicates the target intensity for the respective lighting source 112. For example, the driver 114 may control the respective light source 112 to the low-end intensity $L_{LE}$ when the analog PWM control signal has a duty cycle of 0%, to the high-end intensity $L_{HE}$ when the analog PWM control signal has a duty cycle of 100%, and to an intensity that is linearly scaled between the low-end intensity $L_{LE}$ and the high-end intensity $L_{HE}$ when the analog PWM control signal has a duty cycle between 0% and 100%.

A 0-10V control signal and a 10-0V control signal may have a DC magnitude that ranges between zero and ten volts and indicates a target intensity for the respective light source 112. When receiving a 0-10V control signal, the driver 114 may control the respective light source 112 to the low-end intensity $L_{LE}$ when the 0-10V control signal has a magnitude of one volt, to the high-end intensity $L_{HE}$ when the 0-10V control signal has a magnitude of ten volts, and to an intensity that is linearly scaled between the low-end intensity $L_{LE}$ and the high-end intensity $L_{HE}$ when the 0-10V control signal has a magnitude between one and ten volts. When receiving a 10-0V control signal, the driver 114 may control the respective light source 112 to the low-end intensity $L_{LE}$ when the 10-0V control signal has a magnitude of ten volts, to the high-end intensity $L_{HE}$ when the 10-0V control signal has a magnitude of one volt, and to an intensity that is linearly scaled between the low-end intensity $L_{LE}$ and the high-end intensity $L_{HE}$ when the 10-0V control signal has a magnitude between ten and one volts.

The driver 114 may be responsive to a digital control technique. For example, the driver 114 may be responsive to a digital control signal, such as a digital message, a digital PWM control signal, and/or other digital control signal, received via the control wiring 119. The digital PWM control signal may have digital information encoded in the pulse-width and/or frequency of the signal.

The control module 115 may transmit a digital message to the driver 114 via the control wiring 119, e.g., using a standard protocol, such as the DALI protocol, or a proprietary protocol, such as the ECOSYSTEM protocol. The DALI and ECOSYSTEM protocols may be related, such that if a driver is responsive to commands from the ECOSYSTEM protocol, the driver will also be responsive to commands from the DALI protocol. However, a driver that is responsive to commands from a standard protocol may not be responsive to commands from a proprietary protocol, and vice versa. For example, a driver that is responsive to commands from the DALI protocol may not be responsive to commands from the ECOSYSTEM protocol. The driver 114 may be responsive to digital messages transmitted according to other protocols that are not related to each other.

The driver 114 may be responsive to a control signal received via the power wiring 118, e.g., a phase-control signal or a power-line communication (PLC) signal. For example, the driver 114 may not be responsive to an analog control signal or digital control signal received via the control wiring 119, but may be responsive to a control signal received via the power wiring 118. The driver 114 may not be responsive to control signals received via the power wiring 118 or the control wiring 119, e.g., the driver 114 may simply be responsive to switching control only via the power wiring 118.

The lighting fixture 110 may comprise a different type of light source other than an LED light source (e.g., a fluorescent lamp), and the driver 114 may comprise an appropriate load regulation circuit for the different light source (e.g., an electronic dimming ballast circuit). Examples of ballasts are described in greater detail in commonly-assigned U.S. Pat. No. 7,489,090, issued Feb. 10, 2009, entitled ELECTRONIC BALLAST HAVING ADAPTIVE FREQUENCY SHIFTING, and U.S. Pat. No. 8,593,076, issued Nov. 29, 2013, entitled ELECTRONIC DIMMING BALLAST HAVING ADVANCED BOOST CONVERTER CONTROL, the entire disclosures of which are hereby incorporated by reference. The lighting fixture 110 may comprise a light source that may be driven directly by the control module 115 via the power wiring 118, e.g., an incandescent or halogen lamp, such that the driver 114 is not required.

The lighting fixture 110 may comprise a sensor device 116 that may be electrically coupled to the respective control module 115. The sensor device 116 may be mounted to the lighting fixture 110 (e.g., on a lower or outward-facing surface of the lighting fixture) or external to the lighting fixture 110 (e.g., on a ceiling or wall of the space in which the lighting fixtures are installed).

The sensor device 116 may be configured to detect occupancy and vacancy conditions in the space in which the respective lighting fixture 110 is installed. The control module 115 may be configured to control the respective driver 114 in response to the sensor device 116 determining that the space is occupied or vacant. For example, the control module 115 may be configured to turn on the light source 112 in response to determining that the space is occupied and to turn off the light source in response to determining that the space is unoccupied (e.g., as with an "occupancy" sensor). The control module 115 may be configured to only turn off the light source in response to determining that the space is unoccupied, i.e., turn on the light source in response to determining that the space is occupied (e.g., as with an "vacancy" sensor). Examples of load control systems having occupancy and vacancy sensors are described in greater detail in commonly-assigned U.S. Pat. No. 8,228,184, issued Jul. 24, 2012, entitled BATTERY-POWERED OCCUPANCY SENSOR, the entire disclosure of which is hereby incorporated by reference.

The control module 115 may perform daylighting. The sensor device 116 may be configured to measure a light intensity at the sensor in which the respective lighting fixture 110 is installed. The control module 115 may be configured control the respective driver 114 in response to the light intensity measured by the sensor device 116. Examples of load control systems having daylight sensors are described in greater detail in commonly-assigned U.S. Pat. No. 8,410,706, issued Apr. 2, 2013, entitled METHOD OF CALIBRATING A DAYLIGHT SENSOR, the entire disclosure of which is hereby incorporated by reference.

The control module 115 may be configured to communicate (i.e., transmit and receive) wireless signals, e.g., radio-frequency (RF) signals 106, with the other control modules 115 of the load control system 100. The control modules 115 may be operable to transmit and receive the RF signals 106 with a system controller 120 (e.g., a load controller or a central controller). The control module 115 may be configured to control the respective driver 114 in response to digital messages received via the RF signals 106. The control module 115 may be configured to transmit digital messages including feedback information via the RF signals 106, e.g., to the system controller 120.

The load control system 110 may comprise one or more remote control devices 130 (e.g., a handheld battery-powered remote control) for controlling the light sources 112 of the lighting fixtures 110. The remote control device 130 may be configured to transmit RF signals to the control modules 115 in response to the actuation of one or more actuators 132 (e.g., one or more of an on button, an off button, a raise button, a lower button, and a preset button). Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS, and U.S. Patent Application Publication No. 2012/0286940, published Nov. 12, 2012, entitled CONTROL DEVICE HAVING A NIGHTLIGHT, the entire disclosures of which are hereby incorporated by reference.

The load control system 100 may comprise a wireless occupancy sensor 140 configured to transmit digital messages to the control modules 115 via the RF signals in response to detecting an occupancy or vacancy condition in the space. The control module 115 may be configured to control the respective light source 112 in response to the RF signals received from the occupancy sensor 140 in a similar manner as the control module is responsive to the sensor device 116. Examples of wireless occupancy and vacancy sensors are described in greater detail in commonly-assigned U.S. Pat. No. 8,009,042, issued Aug. 30, 2011 Sep. 3, 2008, entitled RADIO-FREQUENCY LIGHTING CONTROL SYSTEM WITH OCCUPANCY SENSING, and U.S. Pat. No. 8,199,010, issued Jun. 12, 2012, entitled METHOD AND APPARATUS FOR CONFIGURING A WIRELESS SENSOR, the entire disclosures of which are hereby incorporated by reference.

The load control system 100 may comprise a wireless daylight sensor 150 configured to measure the light intensity at the sensor and to transmit a digital message including the measured light intensity to the control modules 115 via the RF signals. Each control module 115 may be configured to control the respective light source 112 in response to the RF signals received from the daylight sensor 150 in a similar manner as the control module is responsive to the sensor device 116. Examples of wireless daylight sensors are described in greater detail in commonly-assigned U.S. Pat. No. 8,451,116, issued May 28, 2013, entitled WIRELESS BATTERY-POWERED DAYLIGHT SENSOR, the entire disclosure of which is hereby incorporated by reference.

The load control system 100 may comprise other types of input devices, such as, for example, temperature sensors, humidity sensors, radiometers, cloudy-day sensors, pressure sensors, smoke detectors, carbon monoxide detectors, air-quality sensors, motion sensors, security sensors, proximity sensors, fixture sensors, partition sensors, keypads, kinetic or solar-powered remote controls, key fobs, cell phones, smart phones, tablets, personal digital assistants, personal computers, laptops, timeclocks, audio-visual controls, safety devices, power monitoring devices (such as power meters, energy meters, utility submeters, utility rate meters), central control transmitters, residential, commercial, or industrial controllers, or any combination of these input devices.

The control module 115 in each lighting fixture 110 may be configured to determine (e.g., automatically determine) the appropriate type of control signal for controlling the driver 114 that is installed in the lighting fixture 110 with the control module 115. For example, the control module 115 may be configured to determine the appropriate type of control signal for controlling the driver 114 upon first being powered up. The control module 115 may be configured to step through one or more possible control techniques (e.g., one or more analog control techniques and/or one or more digital control techniques), attempt to control the driver 114 using the selected control technique, and determine if the driver is responsive to the selected control technique. For example, the control module 115 may attempt to control the driver 114 by generating different control signals (e.g., the 0-10V control signal, the 10-0V control signal, and/or the analog PWM control signal) on the control wiring 119. The control module 115 may also attempt to transmit digital messages to the driver 114 via the control wiring 119 using different protocols (e.g., the DALI protocol and the ECO-SYSTEM protocol). Upon determining that the driver 114 is responsive to one of the control signals or digital messages, the control module 115 may select the present control technique for use during normal operation of the load control system 100. If the control module 115 determines that the driver 114 is not responsive to any of the control signals or digital messages, the control module may determine to use a switching-only control technique during normal operation (i.e., the control module will only switch the light source 112 on and off, and not dim the light source 112).

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

Figure 2:
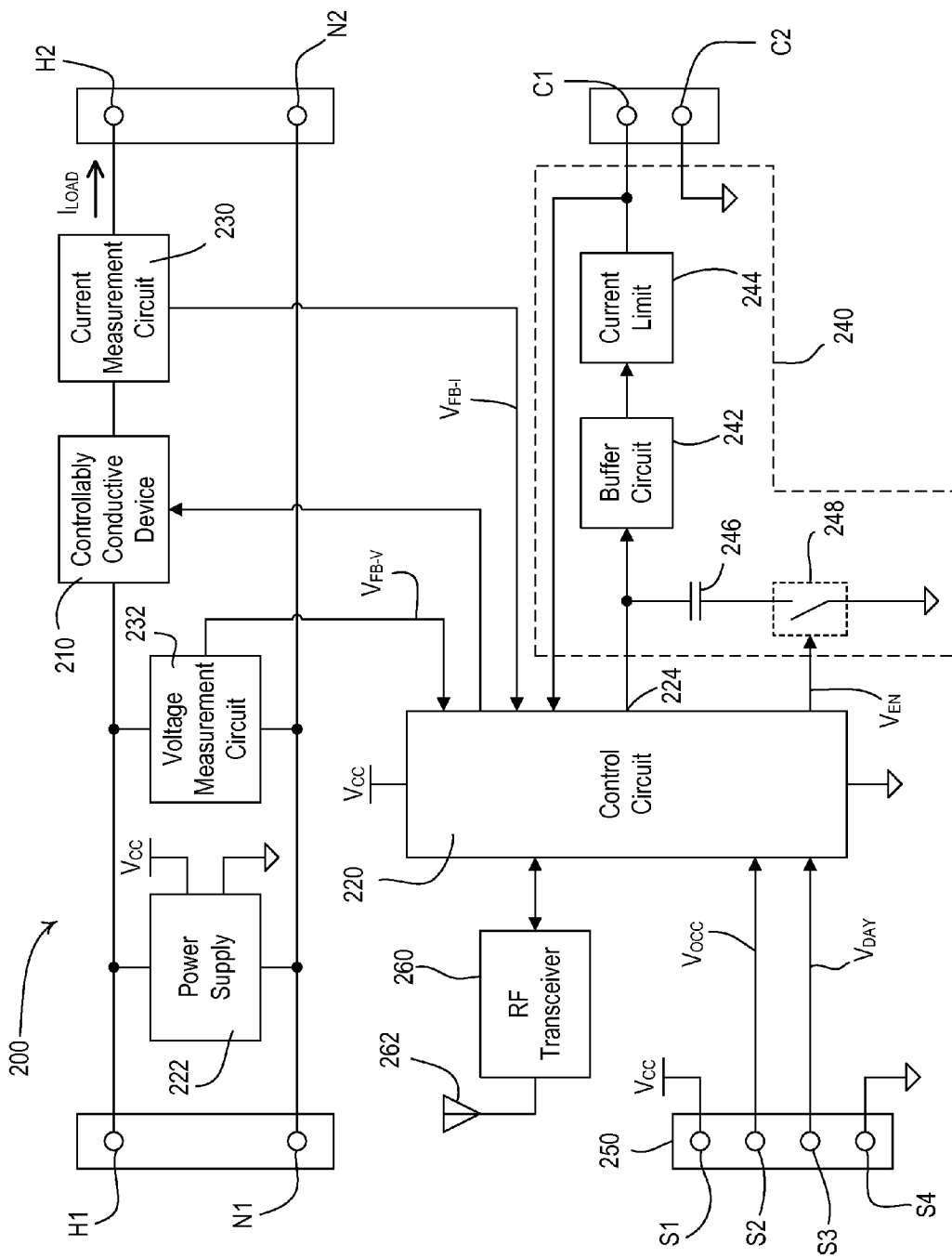
FIG. 2 is a simplified block diagram of a control module for controlling a driver for a light source.

FIG. 2 is a simplified block diagram of a control module 200 for controlling a driver for a light source, which may be deployed as the control module 115 in the load control system 100 shown in FIG. 1. The control module 200 may comprise an input hot terminal H1 and an input neutral terminal N1 adapted to be electrically coupled to an AC power source for receiving a line voltage. The control module 200 may also comprise an output power connection including an output hot terminal H2 and an output neutral terminal N2 adapted to be coupled to an external load regulation device for a lighting load (e.g., to the LED driver 114 via the power wiring 118 shown in FIG. 1). Alternatively, the output hot terminal H2 and the output neutral terminal N2 may be coupled directly to an external lighting load.

The control module 200 may comprise a controllably conductive device 210 coupled in series electrical connection between the input hot terminal H1 and the output hot terminal H2 for controlling the power delivered to the external driver and/or external lighting load. The controllably conductive device 210 may comprise, for example, a relay, a bidirectional semiconductor switch (e.g., such as, a triac, a FET in a rectifier bridge, two FETs in anti-series connection, or one or more insulated-gate bipolar junction transistors), or any other suitable switching circuit. The controllably conductive device 210 may be configured to conduct a load current $I_{LOAD}$ to the driver and/or lighting load. The input neutral terminal N1 may be coupled directly to the output neutral terminal N2. The control module 200 may alternatively comprise a single neutral terminal adapted to be coupled to the AC power source and the driver and/or lighting load.

The control module 200 may comprise a control circuit 220 that may be coupled to the controllably conductive device 210 for rendering the controllably conductive device conductive and/or non-conductive to control the power delivered to the driver and/or lighting load. For example, the control circuit 220 may comprise a microcontroller, a programmable logic device (PLD), a microprocessor, an application specific integrated circuit (ASIC), a field-programmable gate array (FPGA), or any suitable processing device, controller, or control circuit. The control module 200 may comprise memory (not shown). The memory may be implemented as an external integrated circuit (IC) or as an internal circuit of the control circuit 220. The memory may operate to store information such as computer-executable instructions, configuration settings associated with operation of the control module 200 (e.g., the responsive control technique), and/or the like. The memory may include one or more components of volatile and/or non-volatile memory, in any combination.

The control module 200 may comprise a power supply 222 coupled between the input hot terminal H1 and the input neutral terminal N1 for generating a direct-current (DC) supply voltage $V_{CC}$ for powering the control circuit 220 and the other low-voltage circuitry of the control module 200. The DC supply voltage $V_{CC}$ may be referenced to a circuit common, which may comprise a non-isolated circuit common (e.g., referenced to the input hot terminal H1 and/or the input neutral terminal N1) or an isolated circuit common.

The control module 200 may comprise one or more power measurement circuits, for example, a current measurement circuit 230 and/or a voltage measurement circuit 232. The control module 200 may comprise a current measurement circuit 230 coupled in series electrical connection between the input hot terminal H1 and the output hot terminal H2 for measuring the magnitude of the load current $I_{LOAD}$ conducted through the driver and/or lighting load. The current measurement circuit 230 may generate a current feedback signal $V_{FB-I}$ indicating the magnitude of load current $I_{LOAD}$ presently being conducted through the driver and/or lighting load. For example, the current measurement circuit 230 may comprise a sense resistor (not shown) for generating a sense voltage (e.g., the current feedback signal $V_{FB-I}$) in response to the load current $I_{LOAD}$ being conducted through the sense resistor. The control circuit 220 may receive the current measurement signal $V_{FB-I}$ for determining the magnitude of the load current $I_{LOAD}$ being conducted through the driver and/or lighting load.

The control module 200 may comprise a voltage measurement circuit 232 coupled between the input hot terminal H1 and the input neutral terminal N1 for measuring the magnitude of the line voltage of the AC power source. The voltage measurement circuit 232 may generate a voltage feedback signal $V_{FB-V}$ indicating the present magnitude of the line voltage of the AC power source. For example, the voltage measurement circuit 232 may comprise a resistor divider for generating a scaled voltage (e.g., the voltage feedback signal $V_{FB-V}$). The control circuit 220 may receive the voltage measurement signal $V_{FB-V}$ and may calculate the amount of power presently being consumed by the driver and/or lighting load using the present magnitude of the line voltage and the present magnitude of load current $I_{LOAD}$ as measured by the current measurement circuit 230. The control circuit 220 may assume a present magnitude of the line voltage (e.g., 120 V) to calculate the amount of power presently being consumed by the driver and/or lighting load using the present magnitude of load current $I_{LOAD}$, and, for example, may not receive the voltage measurement signal $V_{FB-V}$.

The control module 200 may comprise a control connection including first and second control terminals C1, C2 adapted to be coupled to the driver (e.g., via the control wiring 119 shown in FIG. 1). The control circuit 220 may comprise a control output 224 coupled to the control terminals C1, C2 through a driver communication circuit 240. The driver communication circuit 240 may comprise a buffer circuit 242 and a current limit circuit 244 coupled between the control output 224 of the control circuit and the first control terminal C1. The second control terminal C2 may be coupled to circuit common (e.g., an isolated circuit common). The driver communication circuit 240 may comprise a capacitor 246 and a controllable switching circuit 246, which may be coupled in series between the control output 224 of the control circuit 220 and circuit common. The controllable switching circuit 248 may comprise, for example, a bipolar junction transistor (BJT), a field-effect transistor (FET), or other suitable controllable switch. The control circuit 220 may generate an average enable control signal $V_{EN}$ for rendering the controllable switching circuit 248 conductive and/or non-conductive. The control circuit 220 may be configured to generate an analog control signal (e.g., a 0-10V control signal, a 10-0V control signal, or an analog PWM control signal) and/or a digital control signal (e.g., a digital message) at the control output 224 for controlling the driver coupled to the control terminals C1, C2. The first control terminal C1 may be coupled to the control circuit 220, such that the control circuit may be configured to receive analog feedback (e.g., in case of a miswire condition at the control terminals C1, C2) as well as digital messages from the driver.

The control module 200 may further comprise a sensor port 250 adapted to be electrically coupled to an external sensor device (e.g., the sensor device 116 shown in FIG. 1). For example, the sensor port 250 may comprise a four-pin connector. The sensor port 250 may comprise two pins S1, S4 for coupling the supply voltage $V_{CC}$ and circuit common to the external sensor device for powering the external sensor device. The sensor port 250 may comprise an occupancy control signal pin S2 for receiving an occupancy control signal $V_{OCC}$ from the sensor device, which may indicate an occupancy or vacancy condition detected by the external sensor device. The control circuit 220 may receive the occupancy control signal $V_{OCC}$ and may control the driver and/or lighting load in response to the external sensor device detecting an occupancy condition or a vacancy condition. The sensor port 250 may comprise a daylight control signal pin S3 for receiving a daylight control signal $V_{DAY}$ from the sensor device, which for example, may indicate a light intensity measured by the external sensor device. The control circuit 220 may receive the daylight control signal $V_{DAY}$ and may control the driver and/or lighting load in response to the light intensity measured by the external sensor device. Although not illustrated, the sensor port 250 may comprise a two-pin connector. If the sensor port 250 comprises a two-pin connector, then the two-pins may be used for coupling the supply voltage $V_{CC}$ and circuit common to the external sensor device for powering the external sensor device, and for receiving an occupancy control signal $V_{OCC}$ from the sensor device and/or for receiving a daylight control signal $V_{DAY}$ from the sensor device.

The control module 200 may comprise a wireless communication circuit, for example, including an RF transceiver 260 coupled to an antenna 262 for transmitting and receiving RF signals (e.g., the RF signals 106 shown in FIG. 1). The control circuit 220 may be coupled to the RF transceiver 260 for receiving digital messages via the RF signals 106 from wireless control devices (e.g., the system controller 120, the remote control device 130, the occupancy sensor 140, and/or the daylight sensor 150 shown in FIG. 1). The control circuit 220 may be configured to control the driver and/or lighting load in response to the received digital messages. The control circuit 220 may be configured to transmit digital messages via the RF signals 106, for example, to provide feedback information to the system controller 120. For example, the feedback information may include a status of the control module 220, the driver, and/or the lighting load, the amount of power being consumed by the driver and/or lighting load, a present intensity of the lighting load, an occupancy or vacancy condition detected by the external sensing device, a light intensity measured by the external sensor device, and/or the like.

The control circuit 220 may be configured to generate a plurality of different types of control signals at the control output 224 for controlling external drivers and/or external lighting loads that may require different types of control signals (e.g., using different control techniques or methods). The control circuit 220 may be configured to generate different types of analog control signals (e.g., a 0-10V control signal, a 10-0V control signal, an analog PWM control signal, or other type of dimming control signal) at the control output 224. Since the 0-10V control signal and the 10-0V control signal are DC voltages, the control circuit 220 may render the controllable switching circuit 248 conductive to couple the capacitor 246 between the control output 224 and circuit common when generating the 0-10V control signal or the 10-0V control signal. The control circuit 220 may be configured to generate a PWM signal that is filtered by the capacitor 246 to generate the appropriate DC voltage at the control output 224. The buffer circuit 242 may operate to prevent the capacitor 246 from charging through the current limit circuit 244 or the driver when generating the 0-10V control signal or the 10-0V control signal. When the control circuit 220 is generating the analog PWM control signal at the control output 224, the control circuit 220 may be configured to render the controllable switching circuit 248 non-conductive using the average enable control signal $V_{EN}$, such that the capacitor 244 is not coupled between the control output 224 and circuit common.

The control circuit 220 may be configured to generate a digital control signal, such as a digital message, at the control output 224, e.g., using a standard protocol, such as the DALI protocol, and/or a proprietary protocol, such as the ECOSYSTEM protocol. When transmitting a digital message to the driver coupled to the control terminals C1, C2 via the control output 224, the control circuit 220 may render the controllable switching circuit 248 non-conductive, such that the capacitor 246 is not coupled between the control output 224 and circuit common. To transmit digital messages according to the DALI protocol or the ECOSYSTEM protocol, the control circuit 220 may be configured to short the control terminals C1, C2 together to transmit a logic "1" bit and to not short the control terminals C1, C2 together to transmit a logic "0" bit. For example, the control circuit 220 may transmit digital messages according to the DALI protocol or the ECOSYSTEM protocol using Manchester encoding. In a similar manner, the driver may short the control terminals C1, C2 together to transmit digital messages according to the DALI protocol or the ECOSYSTEM protocol to the control module 200. The current limit circuit 244 may operate to protect the circuitry of the control module 200 when the driver shorts the control terminals C1, C2 together. In addition, the current limit circuit 244 may operate to protect the circuitry of the control module 200 in the event of an installation mistakes, for example, if too many drivers are coupled to the control terminals C1, C2.

Accordingly, the control circuit 220 may control the driver coupled to the control terminals C1, C2 by generating the appropriate analog or digital control signals at the control output 224. In addition, the control circuit 220 may control the controllably conductive device 210 to render the controllably conductive device conductive and non-conductive to turn the driver and lighting load on and off.

The control circuit 220 may be configured to control the controllably conductive device 210 to generate a phase-control signal at the output hot terminal H2 (e.g., if the controllably conductive device comprises a bidirectional semiconductor switch, such as, a triac, a FET in a rectifier bridge, two FETs in anti-series connection, or one or more insulated-gate bipolar junction transistors). In this case, the driver may not be coupled to the control terminals C1, C2, but may be responsive to the phase-control signal to adjust the intensity of the lighting load in response to a firing angle of the phase-control signal. Further, the control circuit 220 may be configured to control the controllably conductive device 210 to render the controllably conductive device conductive and non-conductive to turn the external driver and the lighting load on and off. Such a driver may not be coupled to the control terminals C1, C2. The control circuit 220 may be configured to generate the phase-control signal using a standard phase-control dimming technique, such as forward or reverse phase-control dimming.

A lighting load (e.g., an incandescent lamp) may be coupled directly to the output hot and neutral terminals H2, N2. The control circuit 220 may control the controllably conductive device 210 to generate the phase-control signal at the output hot terminal H2 and may adjust the firing angle of the phase-control signal to adjust the intensity of the lighting load. Further, the control circuit 220 may be configured to control the controllably conductive device 210 to render the controllably conductive device conductive and non-conductive to turn the external lighting load on and off.

The control circuit 220 may be configured to determine (e.g., automatically determine) the appropriate type of control signal for controlling the driver that is coupled to the output hot and neutral terminals H2, N2, for example, when the control module 200 is first powered up, when placed in an advanced programming mode, etc. The control circuit 220 may be configured to step through each of a plurality of control techniques and attempt to control the driver using the selected control technique. For example, the plurality of control techniques may include at least one analog control technique and at least one digital control technique. The control circuit 220 may, for example, attempt to control the driver by generating different control signals (e.g., the 0-10V control signal, the 10-0V control signal, and the analog PWM control signal) at the control terminals C1, C2. The control module 115 may also attempt to transmit digital messages to the driver via the control terminals C1, C2 using different protocols (e.g., the DALI protocol or the ECOSYSTEM protocol).

The control circuit 220 may then determine if the driver is responsive to the selected control technique (e.g., an analog control technique and/or a digital control technique), for example, by monitoring a parameter of the external driver and/or lighting load. The control circuit 220 may monitor, for example, the magnitude of the load current $I_{LOAD}$ and/or the power being consumed by the driver and/or lighting load (e.g., using the current feedback signal $V_{FB-I}$ and/or the voltage feedback signal $V_{FB-V}$) to determine if the driver responded appropriately to the present control signal. For example, the control circuit 220 may control the driver and/or lighting load to the high-end intensity $L_{HE}$ and to the low-end intensity $L_{LE}$ using a single control technique. The control circuit 220 may measure the power being consumed by the driver and/or lighting load at the high-end intensity $L_{HE}$ and at the low-end intensity $L_{LE}$ and determine if these values are in appropriate ranges to determine if the driver is responsive to the selected control technique. The control circuit 220 may be configured to measure the light intensity of the lighting load (e.g., via the sensor device 116 and/or the wireless daylight sensor 150) at one or more intensities to determine if the driver is responsive to the selected control technique. In addition, the control circuit 220 may be configured to receive a digital message back from the driver via the control terminals C1, C2 to determine that the driver is response to a digital message transmitted to the driver. Further, the driver may be configured to monitor and/or measure the parameter and transmit a digital message including the parameter to the control module 200 via the control terminals C1, C2.

Upon determining that the driver is responsive to one of the control signals or digital messages, the control circuit 220 may select the present control technique for use during normal operation. If the control circuit 220 determines that the driver is not responsive to any of the control signals or digital messages, the control circuit may decide to use switching control during normal operation. For example, the control circuit 220 may control the controllably conductive device 201 to switch the driver and/or lighting load on and off, but not dim the driver and/or lighting load.

Figure 3A:
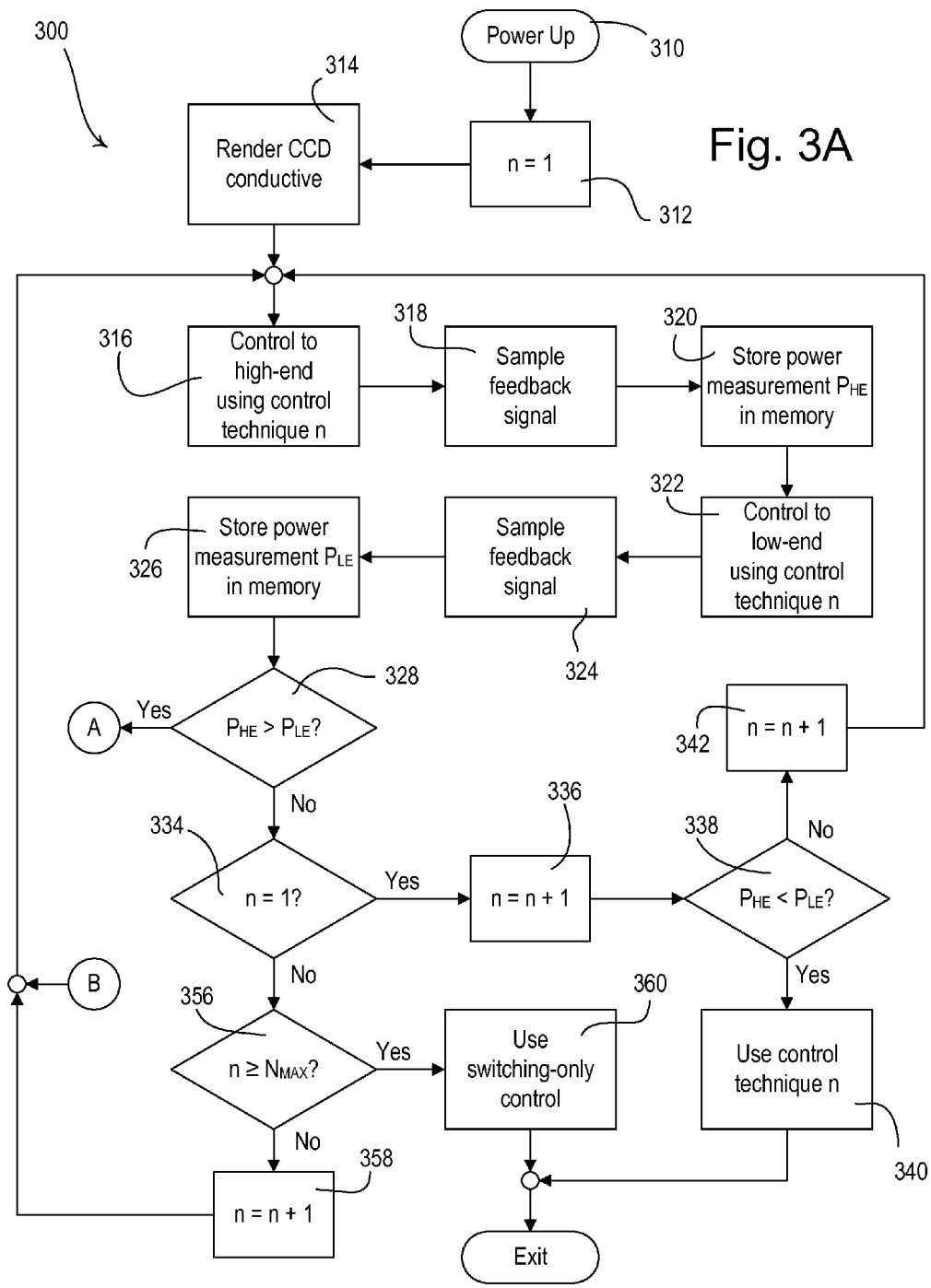
FIGS. 3A and 3B are simplified flowcharts of an example procedure executed by a control module that is adapted to control load regulation devices by a plurality of different control methods or techniques to determine the appropriate control technique to use.
Figure 3B:
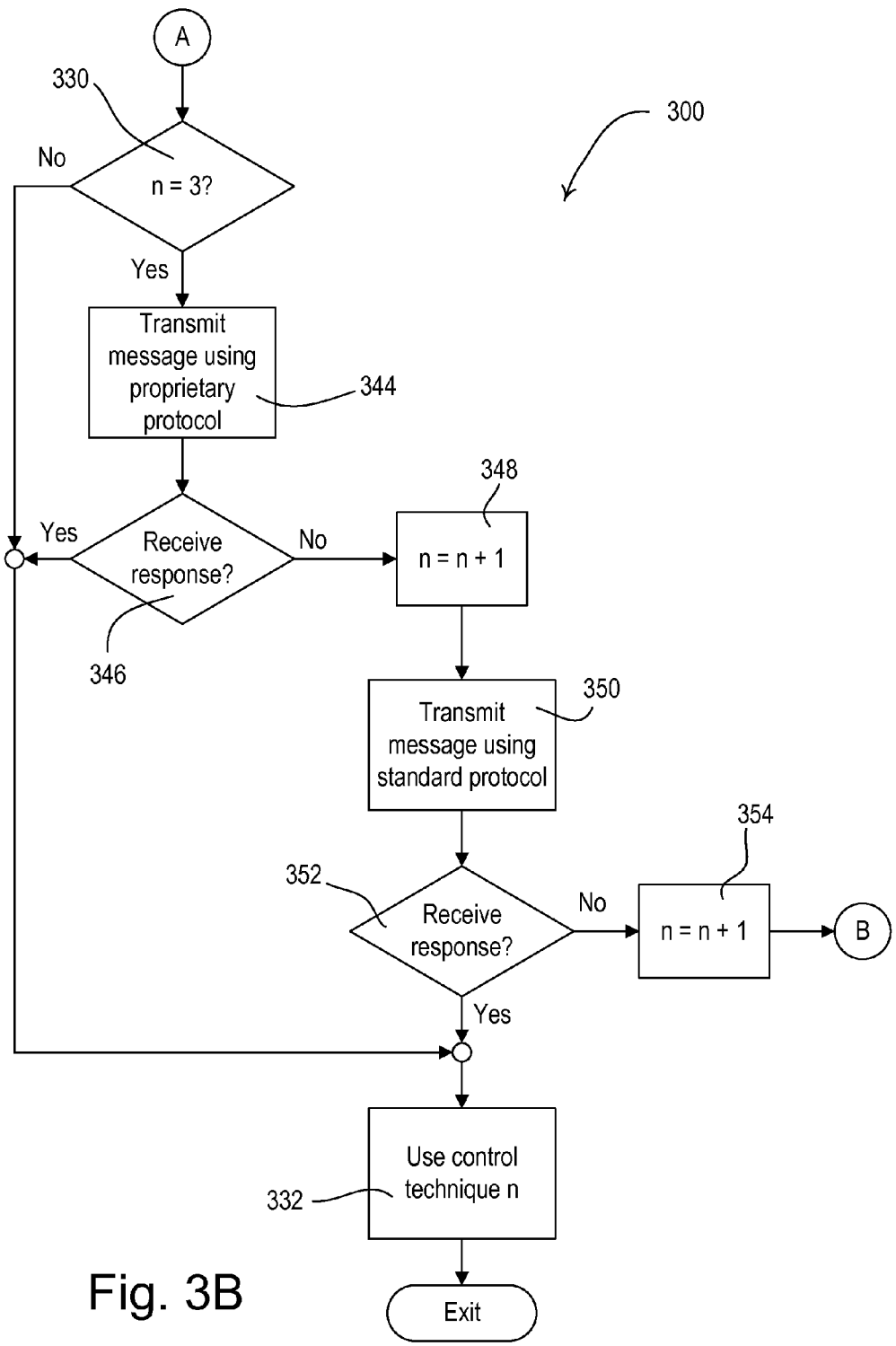

FIGS. 3A and 3B are simplified flowcharts of an example procedure 300 executed by a control module that is adapted to control load regulation devices by a plurality of different control methods or techniques (e.g., the control module 115 for controlling the driver 114 of FIG. 1 and/or the control module 200 of FIG. 2). The procedure 300 may be executed by a control circuit (e.g., the control circuit 220 of FIG. 2) when the control module first powers up and the control circuit starts up at 310. The procedure 300 may be performed at a time other than when the control module first powers up and the control circuit starts up, for example, when the control module is entered into an advanced programming mode and the initiated to perform the procedure 300 by a user.

The control circuit may step through a plurality of control techniques and determine whether the load regulation device is responsive to any of the plurality of control techniques. The plurality of control techniques may include one or more analog control techniques and one or more digital control techniques, for example, in any order and combination. The control circuit may use a variable n to keep track of a present control technique during the procedure 300. For example, the control module may be configured to use a number $N_{CT}$ of control techniques, for example, six control techniques as follows:

| n | Control Technique |
|---|---|
| 1 | 0-10 V Control |
| 2 | 10-0 V Control |
| 3 | ECOSYSTEM Protocol |
| 4 | DALI Protocol |
| 5 | Analog PWM Control |
| 6 | Switching Control Only |

At 312, the control circuit may set the variable n equal to one, for example, such that the control technique is initially set to 0-10V Control. At 314, the control circuit may render a controllably conductive device (CCD) conductive for supplying power to the driver (e.g., the controllably conductive device 210 of FIG. 2).

The control circuit may attempt to control the driver to the high-end intensity $L_{HE}$ using the present control technique at 316. At 318, the control circuit may sample one or more feedback signals that indicate the power being consumed by the driver and/or lighting load (e.g., the current feedback signal $V_{FB-I}$ and/or the voltage feedback signal $V_{FB-V}$ shown in FIG. 2). The control circuit may store a high-end power measurement value $P_{HE}$ in memory at 320 in response to the sampled value of the feedback signal. The control circuit may attempt to control the driver to the low-end intensity $L_{LE}$ using the present control technique at 322, sample the feedback signal at 324, and store a low-end power measurement value $P_{LE}$ in memory at 326.

If the high-end power measurement value $P_{HE}$ is greater than the low-end power measurement value $P_{LE}$ at 328 and the variable n is not equal to three at 330, the control circuit may select the present control technique at 332, before the procedure 300 exits. For example, when the high-end power measurement value $P_{HE}$ is greater than the low-end power measurement value $P_{LE}$ at 328 and the variable n is equal to one at 330, the control circuit may decide to use the 0-10V Control technique during normal operation. If the high-end power measurement value $P_{HE}$ is not greater than the low-end power measurement value $P_{LE}$ at 328 and the variable n is equal to one at 334, the control circuit may increment the variable n by one at 336 and determine if the high-end power measurement value $P_{HE}$ is less than the low-end power measurement value $P_{LE}$ at 338. If so, the control circuit may select the present control technique at 340 (i.e., 10-0V Control), before the procedure 300 exits. If the high-end power measurement value $P_{HE}$ is not less than the low-end power measurement value $P_{LE}$ at 338, the control circuit may increment the variable n by one at 342 and the control circuit may attempt to control the connected driver and/or lighting control using the next control technique at 316.

If the high-end power measurement value $P_{HE}$ is greater than the low-end power measurement value $P_{LE}$ at 328 and the variable n is equal to three at 330, the control circuit may attempt to transmit a digital message using a proprietary protocol (e.g., the ECOSYSTEM protocol) to the driver at 344. For example, the digital message may be a query command that is unique to the ECOSYSTEM protocol (e.g., not included in the DALI protocol). If the driver responds to the digital message at 346, the control circuit may select the present control technique at 332 (i.e., ECOSYSTEM protocol) and the procedure 300 exits. If the driver does not respond to the digital message transmitted using the ECOSYSTEM protocol at 346, the control circuit may increment the variable n by one at 348 and attempt to transmit a digital message using a standard protocol (e.g., the DALI protocol) to the driver at 350. If the driver responds to the digital message at 352, the control circuit may select the present control technique at 332 (i.e., DALI protocol) and the procedure 300 exits. If the driver did not respond to the digital message transmitted using the DALI protocol at 352, the control circuit may increment the variable n by one at 354 and the control circuit may attempt to control the connected driver and/or lighting control using the next control technique at 316.

If the high-end power measurement value $P_{HE}$ is not greater than the low-end power measurement value $P_{LE}$ at 328 and the variable n is not equal to one at 334, the control circuit may determine if the variable n is greater than or equal to the number $N_{CT}$ of control techniques at 356. If not, the control circuit increments the variable n by one at 358 and control circuit may attempt to control the connected driver and/or lighting control using the next control technique at 316. If the variable n is greater than or equal to the number $N_{CT}$ of control techniques at 356, the control circuit may select switching-only control at 360 and the procedure 300 exits.

The control circuit may use the magnitude of the load current $I_{LOAD}$ at high-end and low-end to determine if the driver is responding correctly to the present control technique, for example, rather than calculating and using power measurement values $P_{HE}$, $P_{LE}$ in the procedure 300 of FIGS. 3A and 3B.

While not shown in FIGS. 3A and 3B, the control module may attempt to control the driver and/or lighting load using a phase-control signal and determine if the driver and/or lighting load responds correctly. For example, the control module may measure the peak value and the root-mean-square (RMS) value of the load current conducted through the driver and/or lighting load to determine a current crest factor (CCF), and stop generating the phase-control signal if the current crest factor is too large. The control module may be forced into a mode in which the control module generates the phase-control signal. For example, the installer of the control module could short the control terminals C1, C2 together (e.g., with a wire), and the control module may determine to use the phase-control technique if the control module determines that the control terminals are continuously shorted together. The control module may attempt to control the driver and/or lighting load using the phase-control signal and determine if the driver and/or lighting load responds correctly before, during, or after attempting the plurality of control techniques.

Further, the control module may comprise a programming input, e.g., a dual-inline package (DIP) switch, for setting the appropriate control technique for use by the control module (e.g., which may be referred to as an advanced programming mode). The DIP switch may comprise enough individual mechanical switches or positions to provide a unique switch setting for each of the plurality of control techniques that the control module is capable of generating. For example, the installer of the control module may adjust the DIP switch to the unique switch setting for the desired control technique during installation of the control module. At startup, the control circuit may read the unique switch setting to determine which control technique to use during normal operation. In addition, one of the unique switch settings of the DIP switch may select an automatic control-determination procedure in which the control module may execute the procedure 300 of FIGS. 3A and 3B to determine the appropriate control technique to use.

After a control technique is selected using the DIP switch and the control module is powered up, the control module could execute the procedure 300 of FIGS. 3A and 3B to confirm that the appropriate control technique is selected. If the control technique selected by the DIP switch does not match the control technique determined by the procedure 300, the control module may override the control technique to the technique selected by the procedure 300 and/or may notify the user of an error condition (e.g., by blinking a visual indicator on the control module and/or blinking or adjusting the intensity of the lighting load).

What is claimed is:

1. A control module for controlling an electrical load powered from a power source, the control module comprising:
   an output power connection adapted to be coupled to the electrical load for providing power to the electrical load, the electrical load comprising a driver for controlling a lighting load;
   a control connection for providing a control signal in accordance with a plurality of control techniques to the electrical load, the plurality of control techniques comprising one or more analog control techniques and one or more digital control techniques; and
   a control circuit configured to sequentially generate the control signal at the control connection according to each of the plurality of control techniques and determine if the electrical load is responsive to at least one of the plurality of control techniques.

2. The control module of claim 1, wherein the lighting load comprises a light-emitting diode (LED).

3. The control module of claim 1, wherein the control connection is adapted to be coupled to the driver and the driver is responsive to at least one of the plurality of control techniques.

4. The control module of claim 3, wherein the control circuit is configured to determine if the electrical load is responsive to at least one of the control techniques by monitoring a parameter of the driver or the lighting load.

5. The control module of claim 4, further comprising:
   a power measurement circuit coupled to the output power connection for measuring an amount of power being delivered to the driver;
   wherein the control module is configured to attempt to adjust an intensity of the lighting load to a predetermined intensity using one of the control techniques and to measure the power being consumed by the driver and the lighting load at the predetermined intensity to determine if the driver is responsive to the one of the control techniques.

6. The control module of claim 5, wherein the control circuit is configured to attempt to adjust the intensity of the lighting load to a high-end intensity and to a low-end intensity using the one of the control techniques and to measure the power being consumed by the driver and the lighting load at the high-end intensity and at the low-end intensity to determine if the driver is responsive to the one of the control techniques.

7. The control module of claim 4, wherein the control circuit is configured to transmit a digital message to the driver via the control connection.

8. The control module of claim 7, wherein the control circuit is configured to determine if the driver transmitted a response to the digital message to determine if the driver is responsive to one of the control techniques.

9. The control module of claim 4, wherein the control circuit is configured to receive a digital message indicating a measured intensity of the lighting load and to determine if the driver is responsive to one of the control techniques using the measured intensity.

10. The control module of claim 1, wherein the one or more analog control techniques comprise at least one of a 0-10V control technique, a 10-0V control technique, or an analog PWM control technique.

11. The control module of claim 1, wherein the digital control technique comprises a digital addressable lighting interface (DALI) protocol or an ECOSYSTEM protocol.

12. The control module of claim 1, wherein the control circuit is configured to generate a phase-control signal at the output power connection for controlling the electrical load.

13. The control module of claim 1, wherein, if the control circuit determines that the electrical load is responsive to a specific control technique, the control circuit is configured to control the electrical load using the specific control technique during normal operation.

14. The control module of claim 1, wherein one of the plurality of control techniques comprises switching-only control and the control circuit is configured to use switching-only control if the electrical load is not responsive to the other of the plurality of control techniques.

15. A control module for controlling a driver configured to control a lighting load, the driver powered from a power source, the control module comprising:
   an output power connection adapted to be coupled to the driver for providing power to the driver;
   a power measurement circuit coupled to the output power connection for measuring an amount of power being delivered to the driver;
   a control connection adapted to be coupled to the driver and adapted to provide a control signal in accordance with an analog control technique and a digital control technique;
   a control circuit configured to generate the control signal at the control connection according to the analog control technique, attempt to adjust an intensity of the lighting load to a predetermined intensity using the analog control technique, and measure the power being consumed by the driver and the lighting load at the predetermined intensity using the analog control technique to determine if the driver is responsive to the analog control technique; and
   the control circuit is configured to:
   transmit a digital message to the driver via the control connection according to the digital control technique, and determine if the driver transmitted a response to the digital message to determine if the driver is responsive to the digital control technique; or receive a digital message indicating a measured intensity of the lighting load, and determine if the driver is responsive to the digital control technique based on the measured intensity.

16. The control module of claim 15, wherein the control circuit is configured to attempt to adjust the intensity of the lighting load to a high-end intensity and to a low-end intensity using the analog control technique and to measure the power being consumed by the driver and the lighting load at the high-end intensity and at the low-end intensity to determine if the driver is responsive to the analog control technique.

17. The control module of claim 15, wherein the analog control technique comprises a 0-10V control technique, a 10-0V control technique, or an analog PWM control technique.

18. The control module of claim 15, wherein the digital control technique comprises a digital addressable lighting interface (DALI) protocol or an ECOSYSTEM protocol.

19. The control module of claim 15, wherein, if the control circuit determines that the lighting load is responsive to the analog control technique or the digital control technique, the control circuit is configured to control the lighting load using the control technique to which the lighting load is responsive during normal operation.

20. The control module of claim 15, wherein the control connection is adapted to provide the control signal in accordance with a switching-only control technique, and the control circuit is configured to use the switching-only control technique if the lighting load is not responsive to the analog control technique and the digital control technique.

21. A method comprising:
sequentially providing a control signal to an electrical load according to a plurality of control techniques, the plurality of control techniques comprising one or more analog control techniques and one or more digital control techniques, the electrical load comprising a driver for controlling a lighting load; and
determining if the electrical load is responsive to at least one of the plurality of control techniques.

22. The method of claim 21, wherein the lighting load comprises a light-emitting diode (LED).

23. The method of claim 22, wherein determining if the electrical load is responsive to at least one of the control techniques comprises monitoring a parameter of the driver or the lighting load to determine if the electrical load is responsive to at least one of the plurality of control techniques.

24. The method of claim 22, further comprising:
attempting to adjust an intensity of the lighting load to a predetermined intensity using one of the plurality of control techniques; and
measuring power being consumed by the driver and the lighting load at the predetermined intensity to determine if the driver is responsive to the one of the plurality of control techniques.

25. The method of claim 22, further comprising:
attempting to adjust an intensity of the lighting load to a high-end intensity and to a low-end intensity using one of the plurality of control techniques; and
measuring the power being consumed by the driver and the lighting load at the high-end intensity and at the low-end intensity to determine if the driver is responsive to the one of the plurality of control techniques.

26. The method of claim 22, further comprising:
transmitting a digital message to the driver using one of the plurality of control techniques; and
determining if the driver transmitted a response to the digital message to determine if the driver is responsive to the one of the plurality of control techniques.

27. The method of claim 22, further comprising:
receiving a digital message indicating a measured intensity of the lighting load to determine if the driver is responsive to one of the control techniques using the measured intensity.

28. The method of claim 22, further comprising:
determining that the electrical load is responsive to a specific control technique; and
controlling the electrical load using the specific control technique during normal operation.

29. The method of claim 22, wherein one of the plurality of control techniques comprises switching-only control, and the method further comprising:
determining that the electrical load is not responsive to the other of the plurality of control techniques; and
controlling the electrical load using the switching-only control.

* * * * *